3,004,937
RESINOUS COMPOSITION COMPRISING BUTA-DIENE POLYMER DRYING OIL AND AN ALKYL ACID PHOSPHATE

Walter L. Van Nostrand, Jr., Staten Island, N.Y., and Frank C. La Motta, Fords, N.J., assignors to Esso Research and Engineering Company, a corporation of Delaware
No Drawing. Filed May 28, 1959, Ser. No. 816,379
8 Claims. (Cl. 260—15)

This invention relates to liquid coating compositions comprising an air-blown polymer of butadiene, an alkyl acid phosphate, and a third component chosen from the group consisting of nitrocellulose, alkyd resins and an amino-formaldehyde resin.

It is known to prepare films from liquid polymers of diolefins or copolymers of such diolefins with monomers copolymerizable therewith. These films have been cured by air drying or baking in an oven for about 30 minutes at 300° to 400° F. However, it has not been possible to cure relatively thick films (more than 1.5 mils is thickness) of these oils with any degree of satisfaction.

Recently it has been found that reasonably thick films (1.5 to 3 mils) can be cured provided the oil is first oxidized to contain 10 to 20% oxygen by blowing with the air or oxygen at a temperature between 20° and 280° F. in the presence of a solvent. However, films prepared from these oxidized oils require baking at 300°–400° F. to obtain satisfactory properties. Unfortunately curing in that temperature range produces progressive discoloration of clear and light-colored pigmented films. Such baked films are therefore unsuited for white and pastel topcoat applications or for applications where color uniformity is a prime factor, such as metal wall partitions. The high temperatures required for baking also prevent the application of these air-blown polymers to wood surfaces.

In accordance with the present invention, it has now been found that films of air-blown polymers of butadiene-1,3 can be cured in a reasonable time either by air drying or low temperature baking by adding a small amount of an alkyl acid phosphate, such as ethyl acid phosphate, to the air-blown oil, together with small amounts of an amino-formaldehyde resin such as urea-formaldehyde resin or melamine-formaldehyde resin or cellulose nitrate or an alkyd resin, preparing the film and curing to give hard, chemically resistant coatings of excellent clarity and high impact strength.

These films are particularly advantageous in making white enamels. It has been found that with certain pigments in the white to yellow range some discoloration is noted when the films are cured at high temperatures, e.g. 300°–400° F. Therefore, it has been difficult to get a white enamel which will not discolor at these high temperatures. However, with the addition of small amounts of the above additives to the pigmented resins, the films can be baked at 100°–275° F. for 5 to 30 minutes instead of 300°–400° F. In this way, the color of the original pigment is preserved and the same physical properties obtained. If colored pigments are used, discoloration is not so important and higher temperatures up to 400 F. may be employed with increased hardness.

In accordance with another embodiment of this invention it has also been found that the impact strength of pigmented films prepared from these oxidized oils is unexpectedly increased to very high values by the addition of small amounts of these compounds.

The synthetic oils to which the present invention is applicable are oily polymers of butadiene, isoprene, dimethylbutadiene, piperylene, methylpentadiene or other conjugated diolefins having 4 to 6 carbon atoms per molecule. Instead of polymerizing any of the aforesaid diolefins alone, they may be copolymerized in mixtures with each other or in admixtures with minor amounts of ethylenically unsaturated monomers copolymerizable therewith, e.g., with 5–3% styrene, styrenes having alkyl groups substituted on the ring such as paramethyl styrene, dimethyl styrene, diethyl styrene, acrylonitrile, methacrylonitrile, methyl acrylate, methyl methacrylate, vinyl isobutyl ether, methyl vinyl ketone, and isopropyl methyl ketone. Such synthetic oils may be advantageously prepared by mass polymerization, either in the presence of a hydrocarbon soluble peroxide catalyst, such as benzoyl peroxide or cumene hydroperoxide or in the presence of metallic sodium. Suitable polymerization methods are illustrated below. Throughout the present description it will be understood that all proportions are expressed on a weight basis unless otherwise specified.

SYNTHESIS METHOD A

For example, 100 parts of butadiene-1,3, 50 parts of straight-run mineral spirits boiling between 150° and 200° C. (Varsol), 3 parts of tertiary butyl hydroperoxide (60% pure) and 0.75 part of diisopropyl xanthogen disulfide are heated in a closed reactor at about 90° C. for 40 hours whereupon the residual pressure is released and the unreacted butadiene is allowed to volatilize from the polymerized mixture at 70° C. The resulting product, which is a clear, water-white solution, consists typically of about 60 parts of oily polymer of butadiene, about 4 parts of butadiene dimer, plus solvent and some tertiary butyl alcohol. This solution of polymer is then preferably fractionated to remove the dimer and usualy adjusted to 50% non-volatile matter content. The non-volatile constitutent, which is the oily polymer of butadiene, has a molecular weight between 1,000 and 10,000, preferably between 2,000 and 5,000. It will be understood, of course, that the foregoing procedure is only illustrative and that it can be modified in many ways, particularly as described in U.S. patent application, Serial No. 782,850 of Arundale et al., filed on October 29, 1947, now Patent No. 2,586,594, which describes alternative monomers, catalysts, reaction diluents, polymerization modifiers, suitable ranges of proportions of the various ingredients, suitable ranges of polymerization conditions, etc.

SYNTHESIS METHOD B

An alternative polymerization method using sodium as catalyst is illustrated as follows: 80 parts of butadiene-1,3; 20 parts of styrene; 200 parts of straight-run mineral spirits boiling between 150° and 200° C., 40 parts of dioxane, 0.2 part of isopropanol and 1.5 parts of finely dispersed sodium are heated at about 50° C. in a closed reactor provided with an agitator. Complete conversion is obtained in about 4.5 hours whereupon the catalyst is destroyed by adding an excess of isopropanol to the polymerized charge. The crude product is cooled, neutralized with carbon dioxide or glacial acetic acid or other anhydrous organic acid, and filtered. Instead of neutralizing the alcohol-treated product, the acid may also be added directly to the crude product containing residual metallic sodium and the latter destroyed by the acid. The colorless filtrate is then fractionally distilled to remove the alcohol and modifiers such as dioxane. Finally, additional hydrocarbon solvent is preferably distilled off until a product containing about 50–95% non-volatile matter is obtained, the non-volatile matter being a drying oil having a molecular weight below 10,000, preferably between about 2,000 and 5,000.

Again it will be understood that the described sodium polymerization method may be varied considerably as by omitting the styrene co-reactant; or by adding the styrene only after the polymerization of butadiene monomer has begun; or dioxane may be replaced by 10 to 35 parts of another ether modifier having 3 to 8 carbon atoms such as methyl ethyl ether, dibutyl ether or phenetole; or the modifier may be omitted althogether, especially when it is not essential to obtain a perfectly colorless product. Similarly, isopropanol is not necessary, though aliphatic alcohols of less than 6 carbon atoms generally have the beneficial effect of promoting the reaction when present in amounts ranging from about 2 to 50% based on the weight of sodium catalyst. Furthermore, the mineral spirits may be replaced by other inert hydrocarbon diluents boiling between about −15° and 250° C., preferably between 60° and 200° C., e.g., butane, benzene, xylene, naphtha, cyclohexane, and the like. The diluents are usually used in amounts ranging from 50 to 500 parts per 100 parts of monomer. The reaction temperature may vary between about 40° C. and 100° C., preferably around 65° to 85° C. As a catalyst, 0.1 to 10 parts of dispersed metallic sodium are used per 100 parts of monomers, sodium particle sizes below 100 microns being particularly effective.

The blowing of the above polymeric drying oils with air or oxygen is best carried out in a solvent of moderate to good solvency, e.g., solvents or solvent mixtures having a kauri-butanol value of at least 40. At least a substantial portion of aromatic solvent is generally needed to secure such a KB value, and such aromatic content is highly beneficial in promoting oxygen uptake during the blowing treatment. It also aids materially in permitting high oxygen contents to be secured in the treatment without encountering the instability which induces gelation of the mass being treated. Other strong solvents, such as oxygenated solvents, have similar benefits. While mixtures of high and low KB value solvents are generally useful, the oil can be dissolved in strong solvents from the start, thereby eliminating low solvency solvents. The choice of solvents will, of course, depend on the oxygen content which is desired in the finished oil as well as on the formations of the coating compositions which are to be made from the blown oil, and in the interest of economy it is generally desirable to use the cheapest solvent(s) which possess the needed attributes of kauri-butanol value and compatibility with the various ingredients of the finished coating vehicle which is to be formulated.

Examples of suitable solvents include aromatic or mixtures of aromatic and aliphatic hydrocarbons boiling up to about 250° C. These aromatic solvents may be benzene, toluene, hemimellitent, pseudocumene, mesitylene, propyl benzene, cymene, ethyl toluene, methyl ethyl benzene, xylenes, Solvesso-100 (a mixture of aromatic hydrocarbons boiling from about 150° to 175° C.), Solvesso-150 (a mixture of aromatic hydrocarbons boiling from about 190° to 210° C.), or mixtures thereof. Other suitable solvents include the Varsols which are straight-run mineral spirits boiling in the range of 140° to 205° C., having API gravities of 40 to 55 and varying in aromatic content from 5 to 35 weight percent.

Catalysts suitable for the oxidation reaction of this invention include organic salts of metals such as the naphthenates, octoates, and other hydrocarbon soluble metal salts of cobalt, lead, iron and manganese. These catalysts are used in amounts ranging from 0.001% to 1.0%. Peroxides such as benzoyl peroxide and the like may be added to reduce the induction period.

It is understood that conditions of temperature and time of reaction, ratio of reactants, degree of dilution, presence or lack of solvents and the like will depend upon factors including the degree of oxidation desired and the nature of the starting polymer; therefore, it is not intended that the invention be limited by the specific conditions and examples herein set forth as it is intended to illustrate and not limit the invention.

The nature of the oxidized diolefin polymer depends largely upon the extent of oxidation which in turn depends on various factors including time of oxidation, temperature, presence or absence of catalyst, type of solvent, etc. In general greater extent of oxidation results in a lower solubility of the oxidized polymer in paraffin hydrocarbon solvents. The oxidation can be carried out such that the product is soluble in paraffinic hydrocarbons indicating that the oxidation has proceeded to a relatively slight extent. The oxidation can also be carried out so that the product is insoluble in paraffinic solvents but is completely soluble only in aromatic solvents indicating that the oxidation has proceeded to a high degree. The percent of oxygen in the product will vary according to the conditions from a trace to 20% or more.

According to this invention, an alkyl acid phosphate is added directly or dissolved in a volatile hydrocarbon solvent such as toluene, benzene, solvent naphtha, Varsol, Solvesso-100, Solvesso-150 and the like, and added to the oxidized oil described above. The amount of phosphate added is fairly small, 1 to 5% based on the oxidized oil usually being sufficient. In addition solutions of nitrocellulose, alkyd resins or amino-formaldehyde resins are also added. The nitrocellulose is best added in amounts of 20–40% based on the air-blown oil while the alkyd resin is added in amounts of 20–50% and the amino-formaldehyde resin in amounts of 20–40%. If desired, 15–20% of an amino formaldeyhyde resin may be present with the nitrocellulose as a fourth component.

The alkyl acid phosphates suitable for the purposes of this invention are those in which alkyl groups have been substituted for two of the three hydrogen atoms appearing in ortho phosphoric acid, e.g., $R_2HPO_4$. Typical compounds include methyl, ethyl, propyl, butyl and amyl hydrogen phosphate.

The alkyd resins suitable for this invention include any of the oil modified condensation products of phthalic or maleic acid or anhydride with glycerol. Such resins are well know in the art. See for example "Protective and Decorative Coatings" by Mattiello, John Wiley & Sons, 1947, vol. 1, pages 338–358.

The amino-aldehyde resins suitable for this invention are a well-known class of resins. The amino groups essential thereto are supplied by a variety of related compounds having as a characteristic common to the group possession of more than one functional amino group. Included among the useful compounds are urea; thiourea; dicyandiamide; guanidine; melamine; melam ammeline; thioammeline; bis-triazine (U.S. Patent No. 2,653,143, here incorporated by reference); beta, beta prime bis-thioammeline diethyl ether; 2,6-diamino-1,3-diazine; 5-methyl-2,6-diamino-1,3-diazine; 4-chloro-2,6-diamino-1, 2-diazine; and mixtures of said compounds. The preferred compounds of the group are urea, melamine and dicyandiamide. Some of the named group are included in the generic term "polyamino diazines" and "polyamino triazines."

Aldehydes which may be employed include acetaldehyde, benzaldehyde, butyraldehyde, formaldehyde, furfuraldehyde, and mixtures thereof, but the preferred aldehyde is formaldehyde. Other aldehydes such as crotonaldehyde are less commonly employed.

The form of the formaldehyde may be an aqueous solution, e.g., formalin, or may be from one of its polymeric forms, e.g., paraformaldehyde, which yield formaldehyde under the conditions of the reaction.

The ratio of the amino compound to aldehyde in the reaction mixture may be varied as is known in the art depending upon the qualities desired in the final product. In general, the number of moles of aldehyde employed is based upon the number of reactive or functional amino groups in the selected amino compound. In the case of urea-formaldehyde condensations, as high as three moles of formaldehyde to one of urea may be employed, but it is preferable to use a somewhat lower amount, e.g., between 2.5 and 2 moles of formaldehyde per mole of urea. When the amino compound is of greater functionality, such as in melamine-formaldehyde condensations, it is generally desirable that the ratio of formaldehyde to melamine be between 6:1 and 3:1, although in a given condensation to obtain specific properties it may be desired to use ratios outside the limits above described.

By reference to the reactive amino groups, the molar ratios of aldehyde to amino groups has been found to be in the ratio of from 1:2 and 2:1 in the amino-aldehyde resinous compositions of present-day usage.

Since the resin condensates described herein are to be employed in the protective coatings field and are to be used in solution in organic solvents, it is desirable, if not essential, that the amino-aldehyde condensation be carried out in the presence of alcohols to promote solvent solubility. It is believed that the amine-aldehyde polymers form ethers through the residual alkylol groups of the resin reacting with the alcohol to release water and form ethers.

While butyl alcohol is preferred, other alcohols are acceptable and are employed, including the alcohols from methyl alcohol through octadecanol, i.e., having from 1 to 18 carbon atoms. Branched chain alcohols are also useful, isobutyl alcohol being commonly used.

The nitrocellulose suitable for this invention is a solution of depolymerized pyroxylin in a suitable solvent. The depolymerization is accomplished by heating the pyroxylin under pressure in contact with very dilute acid. Butyl acetate and other esters or ketones are particularly good solvents for the depolymerized pyroxylin. These solutions are often extended with inert solvents such as aromatic hydrocarbons. The cellulose nitrate grades used in preparing lacquers are those having a degree of substitution (D.S.) of 1.9 to 2.3 and a degree of polymerization (D.P.) of 200. (See Schildknecht, High Polymers, volume X. Polymer Processes, Interscience Publishers, 1956, page 397.)

The following specific examples are presented to illustrate the effects of the present invention. All quantities are expressed in this specification and claims on a weight basis unless stated otherwise.

EXAMPLE I

A butadiene-styrene drying oil was prepared from the following charge:

| | Parts |
|---|---|
| Butadiene-1,3 | 80 |
| Styrene | 20 |
| Varsol [1] | 200 |
| Dioxane | 40 |
| Isopropanol | 0.2 |
| Sodium [2] | 1.5 |

[1] Straight-run mineral spirits; API gravity, 49.0; flash, 105° F.; boiling range, 150° to 200° C.; solvent power, 33–37 kauri-butanol value (reference scale: benzene, 100 K.B. value, n-heptane, 25.4 K.B. value).

[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% N.V.M. The resulting product had a viscosity of 1.5 poise at 50% N.V.M. in Varsol solution and the non-volatile portion thereof had an average molecular weight of about 3,000.

The polymer oil thus obtained was dissolved in Solvesso-150 (a substantially 100% aromatic hydrocarbon cut boiling 365°–415° F.) to make a 35% N.V.M. solution. It was then blown with air at about 230° F. until the oxygen content reached 10%. A product containing 16% oxygen was also prepared.

EXAMPLE II

A medium oil-length dehydrated castor oil alkyd resin (Syntex 9, manufactured by Jones-Dabney Company), and ethyl acid phosphate (commercial grade) were blended with the blown oil of Example I containing 10% oxygen by simple mixing of the clear solutions. Films were prepared from the blended solutions, baked as indicated and tested for film properties. Results are summarized in Table I.

*Table I*

[All films: 0.8–1.0 mil, baked 30 min. at 300° F.]

| Number | Vehicle Composition [2] | | | Clear films | | | Paints—30% PVC [1] | | |
|---|---|---|---|---|---|---|---|---|---|
| | Blown oil | Alkyd resin | EAP [3] | Hardness Sward [4] | Pencil [5] | Reverse [6] impact | Hardness Sward [4] | Pencil [5] | Reverse [6] impact |
| 1 | 100 | 0 | 0 | 62 | 4H | <5 | [7] 20 | 4H | <5 |
| 2 | 50 | 50 | 0 | 38 | 2H | <5 | | | |
| 3 | 80 | 20 | 0 | 62 | 4H | <5 | | | |
| 4 | 95 | 0 | 5 | 48 | 4H | 160 | 12 | 3H | 5 |
| 5 | 47.5 | 47.5 | 5 | 62 | 4H | 160 | 16 | 4H | 40 |
| 6 | 75 | 20 | 5 | 60 | 3H | 160 | 18 | 4H | 50 |

[1] PVC=pigment volume concentration=volume of pigment/volume of total solids. Pigmentation=50% TiO$_2$, 50% talc (by volume).
[2] Weight percent.
[3] EAP=ethyl acid phosphate.
[4] Sward hardness in percent based on plate glass=100.
[5] Pencil hardness=softest pencil that will cut film. 6B=softest, 7H=hardest.
[6] Reverse impact=in inch pounds that coating will withstand without visible failure.
[7] Rough surface of pigmented films results in low Sward hardness, although films are very hard as measured by pencil.

The data in Table I show that the unmodified blown oil does not have good impact resistance, either clear or pigmented, when baked at 300° F. for 30 minutes (coating #1). Modification with 20-50% alkyd resin does not improve the impact resistance (coatings #2 and #3). While the modification with 5% ethyl acid phosphate results in extremely good impact resistance with clear films baked 30 minutes at 300° F., no improvement results with pigmented coatings at that temperature (coating #4). However, the combination of 20-50% alkyd resin and 5% ethyl acid phosphate results in improved impact resistance with both clear and pigmented films (coatings #5 and #6).

EXAMPLE III

Nitrocellulose (½ second RS grade as a 30-40% solution in methyl ethyl ketone) and ethyl acid phosphate were blended with the blown oil of Example I containing 16% oxygen by simple mixing of the solutions. Films were prepared by coating steel panels with the resulting mixture and the coated panels were then air-dried and the dried films tested. The results are shown in Table II.

EXAMPLE IV

The air-blown oil of Example I containing 16% oxygen was mixed with ethyl acid phosphate and a melamine-formaldehyde resin (MM55, manufactured by Rohm and Haas), or a urea-formeldehyde resin (Uformite F-222, manufactured by Rohm and Haas), and 1 mil films were prepared therefrom by spreading on steel panels with wire-wound rods. The films were cured by air drying and baking at 100°-225° F. for times varying from 15 minutes to 2 hours. The data are shown in Table III.

The data in Table III show that the air-blown oil either unmodified or modified only with ethyl acid phosphate or melamine-formaldehyde resin does not cure when baked for 15 minutes at 200° F. (coatings 1-3). However, modification with both ethyl acid phosphate and amino resin yields films which are hard and impact resistant after baking under the same conditions (coating #4). Furthermore, this same combination produces hard films over a range of low temperatures (140°-225° F.) (coatings #5-11). Urea-formaldehyde resins can be substituted for the melamine-formaldehyde resins to give films of equivalent hardness and impact resistance under similar conditions (coatings #12-15).

*Table III*

| Number | Coating vehicle combination | Cure | Hardness | | Reverse impact [3] |
|---|---|---|---|---|---|
| | | | Sward [1] | Pencil [2] | |
| 1 | Air blown oil | 15'-200° F | 12 | 3B | 5 |
| 2 | Air blown oil+20% [4] MM55 [5] | 15'-200° F | 16 | HB | 5 |
| 3 | Air blown oil+5% EAP [6] | 15'-200° F | 16 | HB | 5 |
| 4 | Air blown oil+5% EAP+20% MM55 | 15'-200° F | 24 | 2H | 80 |
| 5 | do | 60'-140° F | 18 | F | 5 |
| 6 | do | 120'-140° F | 26 | H | 5 |
| 7 | do | 15'-200° F | 24 | 2H | 80 |
| 8 | do | 30'-200° F | 38 | 4H | 120 |
| 9 | do | 10'-225° F | 18 | F | |
| 10 | do | 20'-225° F | 30 | 2H | |
| 11 | do | 30'-225° F | 40 | 3H | |
| 12 | Air blown oil+2% EAP+20% F-222 [7] | 60'-140° F | 18 | F | 25 |
| 13 | do | 15'-200° F | 24 | 3H | 5 |
| 14 | do | 30'-200° F | 38 | 4H | 20 |
| 15 | Air blown oil+2% EAP+30% F-222 | 15'-200° F | 30 | 2H | 20 |

[1] Sward rocker hardness in percent—based on plate glass=100.
[2] Pencil hardness=softest pencil that will cut film. 6B is softest, 7H hardest. Scale=6B . . . B, HB, F, H . . . 7H.
[3] Reverse impact=(inch-pounds). Impact that coating will withstand without visible cracking or failure.
[4] All percentages are expressed in weight percent of total vehicle solids.
[5] MM55=melamine-formaldehyde resin.
[6] EAP=ethyl acid phosphate.
[7] F-222=urea-formaldehyde resin.

*Table II*

| | Tack-free time (A.D.) | Hardness | | | |
|---|---|---|---|---|---|
| | | Sward | | Pencil | |
| | | A.D.[1] | [2] | A.D.[1] | [2] |
| Blown oil | >7 days | Tacky | | Tacky | |
| Blown oil plus 30.4% NC, 1.4% EAP | <1 hour | 28 | 18 | 2H | 2H |
| Blown oil plus 37.5% NC, 1.4% EAP | <1 hour | 36 | 22 | 4H | 2H |

[1] Readings taken after 24 hours.
[2] 30 minutes at 100° F.
A.D.=Air dried.
NC=Nitrocellulose.

The above data show that blown oils containing 16% oxygen will not air dry in seven days but when modified by the addition of both nitrocellulose and ethyl acid phosphate they will air dry tack-free in less than one hour. When these same films are baked at slightly elevated temperatures, the cure is accelerated and hard films are produced in 30 minutes.

EXAMPLE V

Urea and melamine-formaldehyde resins were added to the composition of Example III and films prepared in the same manner. These films were cured by air drying and baking for fifteen minutes to one hour at 100°-140° F. The data are shown in Table IV.

The data in Table IV show that the addition of amino-formaldehyde resins to blends of blown oils with ethyl acid phosphate and nitrocellulose produce films that air dry to hard finishes. By baking at slightly elevated temperatures the cure is accelerated and hard films are prepared in 15 to 30 minutes.

The data set forth in all of these examples clearly show that hard impact-resistant coatings can be prepared by air drying or low temperature baking of compositions consisting essentially of air-blown polymers of conjugated diolefins of 4 to 6 carbon atoms and 1 to 5% of ethyl hydrogen phosphate or other alkyl acid phosphate together with at least one other additive selected from the group consisting of nitrocellulose, alkyd resins and an amino-formaldehyde resin.

Table IV

| No. | Coating vehicle combination [1] | Cure | Tack-free time | Hardness Sward [2] | Hardness Pencil [3] |
|---|---|---|---|---|---|
| 1 | Air blown oil+30.4% NC+1.4% EAP+14.1% U [4] | Air dried | <1 hour | 34 | 2H |
| 2 | Air blown oil+20.0% NC+1.6% EAP+16.0% U | do | 1 hour | 18 | F |
| 3 | Air blown oil+10.2% NC+1.8% EAP+18.0% U | do | 2 hours | 10 | HB |
| 4 | Air blown oil+21.0% NC+4.0% EAP+15.8% M | do | <1 hour | 18 | F |
| 5 | Air blown oil+10.5% NC+4.5% EAP+17.9% M | do | 4-16 hours | 8 | HB |
| 6 | Air blown oil+30.4% NC+1.4% EAP+14.1% U | 30'-100° F | | 42 | 2H |
| 7 | Air blown oil+20.0% NC+1.6% EAP+16.0% U | 60'-100° F | | 26 | H |
| 8 | Air blown oil+30.4% NC+1.4% EAP+14.1% U | 15'-140° F | | 68 | 3H |
| 9 | Air blown oil+20.0% NC+1.6% EAP+16.0% U | do | | 20 | F |
| 10 | do | 30'-140° F | | 28 | H |
| 11 | Air blown oil+30.4% NC+1.4% EAP+14.1% U | do | | 22 | 2H |

[1] Composition—weight percent.
[2] Sward rocker hardness in percent-based on plate glass=100.
[3] Pencil hardness—softest pencil that will cut film. 6B is softest, 7H hardest. Scale=6B .. B, HB, F, H . . . 7H.
[4] NC=nitrocellulose; EAP=ethyl acid phosphate; U=urea formaldehyde (Uformite F-222—Rohm & Haas Company); M=melamine formaldehyde (Uformite MM-55—Rohm & Haas Company).

The nature of the present invention having been thus fully set forth and specific examples of the same given, what is claimed as new and useful and desired to be secured by Letters Patent is:

1. A coating composition comprising (1) a liquid polymer drying oil chosen from the group consisting of homopolybutadiene and copolymers of butadiene-1,3 and styrene containing 5 to 30 wt. percent styrene and 70 to 95 wt. percent butadiene-1,3 which polymer drying oil has been blown with air until the polymer contains 10 to 20% oxygen; (2) 1 to 5% of an alkyl acid phosphate having the formula $R_2PO_4$ in which R is a radical from the group consisting of methyl, ethyl, propyl, butyl and amyl containing 1 to 5 carbon atoms; and (3) a third component chosen from the group consisting of 20 to 40 wt. percent of a nitrocellulose, 20 to 50 wt. percent of an oil modified alkyd resin of a polybasic acid and glycerol, and 20 to 40 wt. percent of an amino-formaldehyde resin, each of said amounts being based on the air-blown polymer.

2. A coating composition according to claim 1 in which the polymer is a homo polymer of butadiene-1,3.

3. A coating composition according to claim 1 in which the polymer is a copolymer of butadiene-1,3 and styrene.

4. A coating composition according to claim 3 in which the third component is nitrocellulose.

5. A coating composition according to claim 3 in which the third component is an oil modified alkyd resin.

6. A coating composition according to claim 3 in which the third component is melamine-formaldehyde resin.

7. A coating composition according to claim 3 in which the third component is urea-formaldehyde resin.

8. A composition according to claim 4 in which 15 to 20% of an amino-formaldehyde resin is present as a fourth component.

References Cited in the file of this patent

UNITED STATES PATENTS

| 2,793,196 | Mason | May 21, 1957 |
| 2,888,417 | Crouch | May 26, 1959 |

FOREIGN PATENTS

| 794,636 | Great Britain | May 7, 1958 |
| 1,151,759 | France | Feb. 5, 1958 |